United States Patent [19]

Takayanagi et al.

[11] 4,007,069
[45] Feb. 8, 1977

[54] PROCESS FOR MAKING RADIAL TIRES

[75] Inventors: Toshiaki Takayanagi, Kodaira; Hiroaki Tsubakihara, Kurume; Hiroshi Fukuyama, Higashi-Murayama, all of Japan

[73] Assignee: Bridgestone Tire Company Limited, Tokyo, Japan

[22] Filed: July 9, 1975

[21] Appl. No.: 594,288

Related U.S. Application Data

[63] Continuation of Ser. No. 464,667, April 26, 1974, abandoned, which is a continuation of Ser. No. 212,937, Dec. 28, 1971, abandoned.

[30] Foreign Application Priority Data

Dec. 29, 1970  Japan .................. 46-120690

[52] U.S. Cl. .................. 156/123; 152/354; 156/128 R; 156/133
[51] Int. Cl.² .................. B29H 17/14; B29H 17/26
[58] Field of Search .......... 156/110, 112, 123, 124, 156/126–130, 133; 152/354, 355, 357, 361 R, DIG. 4

[56] References Cited

UNITED STATES PATENTS

| 1,220,178 | 3/1917 | Brucker | 156/128 R |
| 1,282,767 | 10/1918 | Darrow | 156/128 R |
| 2,686,554 | 8/1954 | Hinman | 156/127 |
| 2,814,331 | 11/1957 | Vanzo et al. | 156/123 |
| 2,874,742 | 2/1959 | Lugli | 152/361 R |
| 3,170,499 | 2/1965 | Deist | 156/130 |
| 3,276,930 | 10/1966 | Keefe | 156/128 |
| 3,409,491 | 11/1968 | Pacciarini et al. | 156/133 |
| 3,512,568 | 5/1970 | Delobelle | 152/361 R |
| 3,759,306 | 9/1973 | Greiner | 152/361 R |

Primary Examiner—Charles E. Van Horn
Assistant Examiner—John E. Kittle
Attorney, Agent, or Firm—Fleit & Jacobson

[57] ABSTRACT

A radial tire and a three-step process for making the radial tire. In the first step an intermediate tire assembly is made by assembling a carcass and side rubber layers. In the second step a green case is made by flexing the intermediate tire assembly and mounting a breaker and a tread rubber layer on the carcass. In the third step the green case is vulcanized. The tread rubber layer has edge portions made of the same rubber material as the side rubber layers.

7 Claims, 13 Drawing Figures

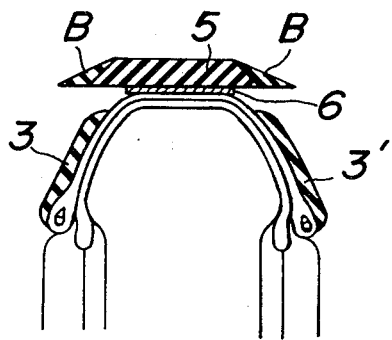
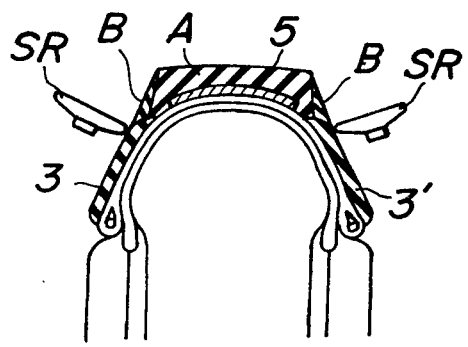
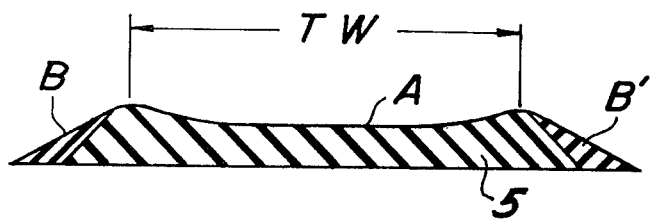
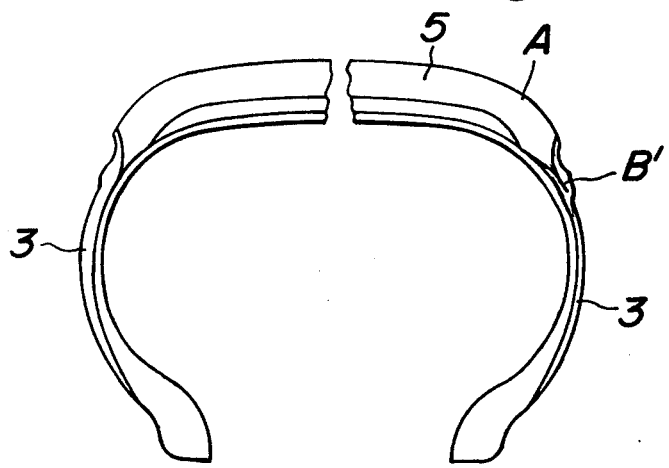

PROCESS FOR MAKING RADIAL TIRES

This is a continuation of U.S. patent application Ser. No. 464,667 filed Apr. 26, 1974, which is a continuation of U.S. patent application Ser. No. 212,937 filed Dec. 28, 1971, both abandoned.

BACKGROUND OF THE INVENTION

1. Field of the Invention:

This invention relates to a process for making radial tires, and more particularly to a process for making radial tires having a carcass including one or more rubberized cord plies whose cords are disposed substantially along planes radially emanating from the axis of the tire rotation and a pneumatic tire built by the process.

2. Description of the Prior Art:

Generally speaking, a radial tire comprises a carcass including one or more carcass plies whose cords which are disposed substantially on tire meridian planes or radial planes emanating from the axis of rotation of the tire, a breaker mounted on the outer peripheral surface of the carcass along the equator of the tire, said breaker having cords disposed at an angle of 10° to 30° relative to the equatorial direction or plane of the tire, and a tread secured to the carcass so as to cover the breaker. The tire breaker acts to reinforce the tire crown.

Thus, the angle of the carcass cords of a radial tire relative to the equatorial direction is greatly different from that of its breaker cords. More particularly, the angular difference between the carcass cords and the breaker cords amounts to 60° to 80° in the case of radial tires, while the corresponding angular difference for conventional bias tires is about 10°. As a result, the conventional one-step formation of bias tire green cases, in which all the tire making operations including the assembling and shaping of the various components into a green case are carried out on a cylindrical tire former, cannot be used for making the radial tire.

Accordingly, radial tire green cases have conventionally been made by a two-step process; namely, a first step of stretching and forming a carcass on a cylindrical former together with bead wires, chafers, and rubber stiffeners to be incorporated in the carcass followed by application of side rubber layers; and a second step of flexing the carcass formed in the first step into a toroidal shape having a cross section similar to that of a finished radial tire. In the second step, a breaker having a width substantially equal to the width of a tire tread and a tread rubber layer are successively secured to the outer crown portion of the carcass thus shaped. The two-step process must be used in making a radial tire green case because of the aforesaid large angular difference between the carcass cords and the breaker cords.

The tread rubber layer and the side rubber layer cooperate so as to form a continuous rubber layer covering almost the entire outer surface of the tire, including the crown portion which comes in contact with the road surface, the opposite shoulder portions, and the opposite side portions extending to the close proximity of the tire beads. The crown portion of the continuous rubber layer is required to have certain performance characteristics which are different from those required for the side portions. More particularly, high abrasion resistance is required for the crown portion because the crown portion contacts the road surface. On the other hand, high flexibility is required for the side portions because the side portions must flex upon loading. It should be noted that the extent of the flexing of the radial tire side portions upon loading is considerably larger than that of conventional bias tires.

Abrasion resistance and flexibility are incompatible properties of rubber materials so that different kinds of rubber materials are used for the crown portion and for the side portions of the radial tire. Usually, a rubber material having a Shore A hardness of 55° to 75° upon vulcanization is used for the crown portion, while a rubber material having a Shore A hardness of 40° to 55° upon vulcanization is used for the side portions. As pointed out in the foregoing, the side portions of the tread rubber layer are secured to the carcass in the first step, while the crown portion of the thread rubber layer is mounted in the second step. If a composite thread rubber layer having both the crown portion and the side portions in one piece is applied in the second step, the inner edge portions of the side rubber layers, which are comparatively closer to the axis of rotation of the tire, tend to wrinkle due to the difference in radius between the inner portion and outer portion of the tire. Such wrinkles make the tire shaping difficult.

Therefore, an object of the present invention is to obviate the aforesaid difficulties in the conventional process of making radial tires having a crown portion covered with one rubber material and side portions covered with a different rubber material by providing an improved process of efficiently making radial tires while ensuring high crack resistance and high separation resistance.

SUMMARY OF THE INVENTION

According to the present invention, there is provided a process for making a pneumatic tire comprising a first step of stretching and forming a carcass having one or more rubberized carcass plies directly on a cylindrical former followed by securing a pair of highly flexible side rubber layers to said carcass, each of said carcass plies consisting of cords disposed at 70° to 90° to the equatorial direction of the tire, said side rubber layers each having a Shore A hardness of 40° to 55° upon vulcanization; a second step of forming a green case by flexing the carcass thus formed into a toroidal shape followed by securing a rubberized breaker layer and a tread rubber layer to the crown portion of the carcass, said breaker layer consisting of cords disposed at 10° to 30° to the equatorial direction of the tire, said tread rubber layer consisting of a central body portion made of a highly abrasion-resistant rubber material with a Shore A hardness of 55° to 75° upon vulcanization and a pair of edge portions made of the same rubber material as said side rubber layer and integrally pre-bonded to said central body portion prior to said second step, said edge portions of the tread rubber layer being bonded to said side rubber layers after securing of the tread rubber layer to the crown portion of the carcass; and a third step of vulcanizing the green case thus formed.

The present invention also provides a pneumatic tire comprising a pair of beads, a carcass extending from one of the beads to the other and consisting of at least one rubberized carcass ply having cords disposed at 70° to 90° to the equatorial direction of the tire, and a pair of sidewall rubber layers secured to the outer surfaces of opposing sidewalls of the carcass, said sidewall rubber layers having a Shore A hardness of 40° to 55° upon vulcanization, a rubberized breaker layer secured to the outer surface of the crown portion of the carcass and consisting of cords disposed at 10° to 30° to the equatorial direction of the tire, and a tread rubber layer secured to the outer surface of the breaker layer and having a Shore A hardness of 55° to 75° upon vulcanization the boundary between the sidewall rubber layer and the tread rubber layer in a cross section of the tire defined by a radial plane emanating from the axis of rotation of the tire comprising two line segments which intersect with each other at an acute angle with the tread rubber being disposed within the angle.

BRIEF DESCRIPTION OF THE DRAWING

For a better understanding of the invention, reference is made to the accompanying drawings, in which:

FIGS. 6A and 6B are cross-sectional views showing the second step of the process according to the present invention;

FIG. 7 is a cross-sectional view of a tread rubber layer to be used in the process according to the present invention;

FIGS. 9 and 10 are a cross-sectional view and an exploded view, each comparing a conventional tire on the left-hand side and a tire of the invention on the right-hand side, respectively.

Like parts are designated by like numerals and symbols throughout the drawings.

DESCRIPTION OF PREFERRED EMBODIMENT

A conventional process of making radial tires will briefly be described in order to clarify the features of the process according to the present invention.

Figure 1:
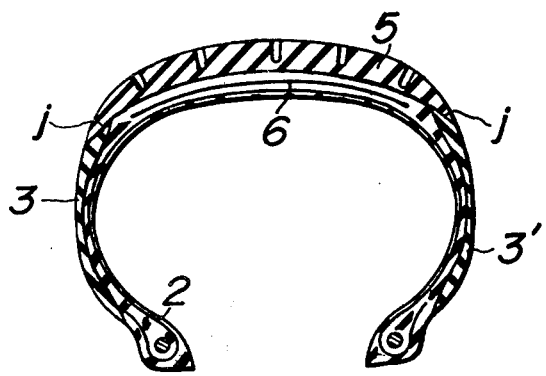
FIG. 1 is a cross-sectional view of a radial tire made by a conventional process.

Referring to FIG. 1, in the conventional process for making radial tires, the rubber layer covering the tire outer surface is divided into a tread rubber layer 5 and a pair of side rubber layers 3, 3', the side rubber layers 3, 3' being secured to the carcass 2 in the first step of the process. The tread rubber layer 5 is secured to the carcass means 2 in the second step.

Such conventional process has the shortcoming that the tread rubber layer 5 and the side rubber layers 3, 3' tend to easily separate along joints j due to the difference of rubber materials used in the two layers. Thus, radial tires made by the conventional process are susceptible to serious separation faults. Furthermore, the side rubber layers 3, 3' thus formed tend to produce cracks. Accordingly, durability of the radial tires made by the conventional process has been rather poor.

Figure 2:
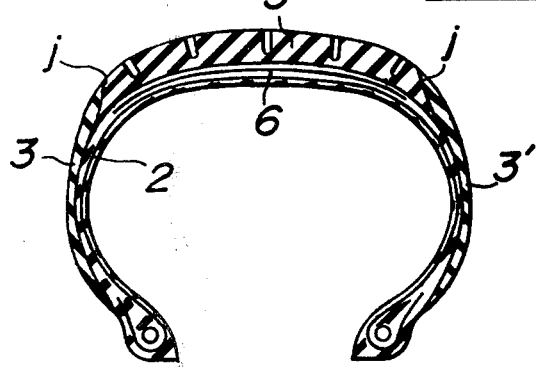
FIG. 2 is a cross-sectional view of an improved radial tire.
Figure 3:
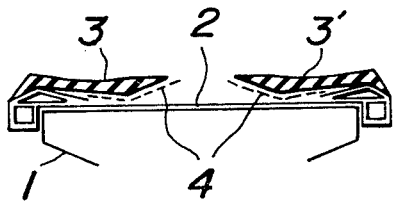
FIG. 3 is a cross-sectional view of a manufacturing stage of the tire of FIG. 2.
Figure 4A:
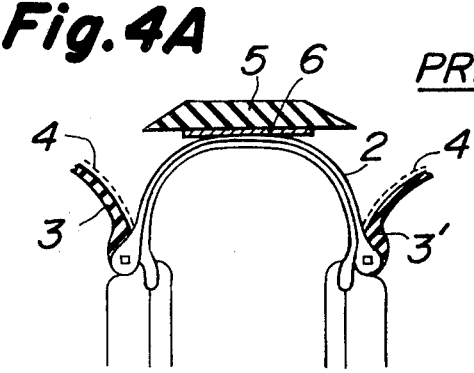
FIGS. 4A to 4C are diagrammatic illustrations of the manner in which the tread portion of the tire of FIG. 2 is formed.
Figure 4B:
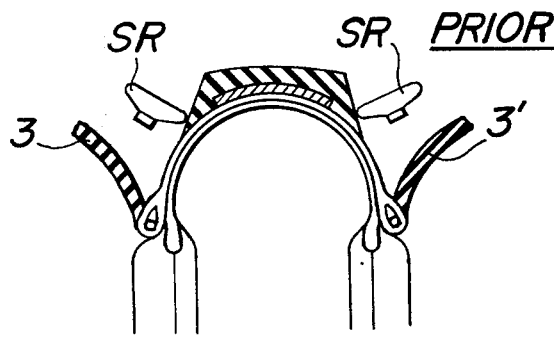
Figure 4C:
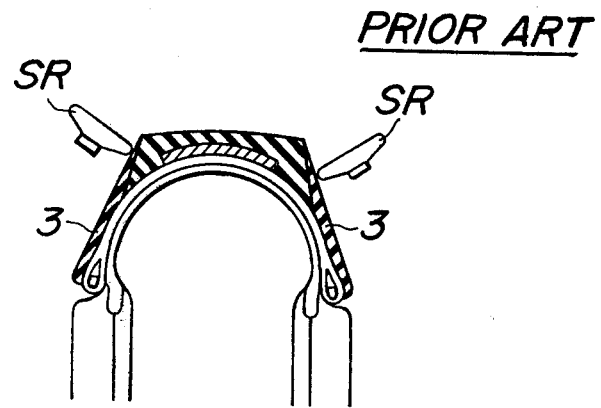

In order to obviate such difficulty, it has been proposed to modify the direction of the joint j between the tread rubber layer 5 and the side rubber layers 3, 3', as shown in FIG. 2. However, a complicated process is required to make the joint j of FIG. 2. In the first step of the proposed process, rubber-repellent sheets 4, e.g., polyethylene sheets, are inserted between the crown portion of carcass means 2 on a former 1 and side rubber layers 3, 3' for preventing the side rubber layers 3, 3' from being directly bonded to the carcass 2 as shown in FIG. 3. Before beginning the second step of the process, the crown side ends of the side rubber layers 3, 3' are moved away from the carcass 2 as shown in FIG. 4A. After removing the rubber-repellent sheets 4, a breaker layer 6 and a crown tread rubber layer 5 are secured to the carcass 2 for completing the second step of the conventional process as shown in FIG. 4B. Then, the aforesaid crown side ends of the side rubber layers 3, 3' are bonded to opposite side surfaces of the tread rubber layer 5, for instance, by stitcher rolls SR as shown in FIG. 4C.

The process as shown in FIGS. 3 and 4A to 4C may improve the performance of the radial tire, but it is too complicated to efficiently manufacture radial tires.

Therefore, the inventors have carried out a series of studies and experiments on the simplification of the process of making radial tires, and have invented an improved process which is simple yet ensures high resistance to cracks and separation of rubber layers.

Figure 5:
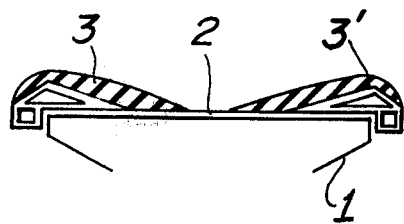
FIG. 5 is a cross-sectional view showing the first step of a process according to the present invention.

The present invention will now be described in detail. In FIG. 5, illustrating the first step of the process according to the present invention, a carcass 2 having carcass plies is assembled on a cylindrical former 1, together with bead wires, bead fillers, and chafers. A pair of side rubber layers 3, 3', each consisting of a highly flexible rubber material with a Shore A hardness of 40° to 55° upon vulcanization, and a pair of breaker edge undercushion strips 8 are secured and bonded to the carcass 2 to form an intermediate tire assembly. In the second step of the process, the intermediate tire assembly as formed in the first step is transformed into a toroidal shape which is close to the finished shape. A breaker layer 6, consisting of one or more rubberized cord sheets, is secured to the crown portion of the toroidal carcass 2, and a tread rubber layer 5 is then bonded to the breaker layer 6, as shown in FIG. 6A. The assembly thus formed is then shaped into in green case, e.g., by stitcher rolls SR, as shown in FIG. 6B.

According to an important feature of the present invention, the tread rubber layer 5 to be secured to the breaker 6 on the tire crown portion is pre-formed, e.g., pre-extruded by a duplex tuber using two different rubber materials. More particularly, the tread rubber layer 5 to be used in the process of the present invention comprises three portions; namely, a central portion A and a pair of side edge portions B, B', as shown in FIG. 7. The central portion A is made of a highly abrasion-resistant rubber material with a Shore A hardness of 55° to 75°, while each side edge portion B, B' is made of another rubber material which is highly flexible and has a Shore A hardness of 40° to 55°. In fact, the rubber material for the side edge portions B, B' of the tread rubber layer 5 is the same as that of the side layers 3, 3'. Thus, the properties of the side edge portions B, B' of the tread rubber layer 5 are the same as those of the side rubber layers 3, 3'.

The green case formed in the second step is vulcanized in a third step.

Figure 8:
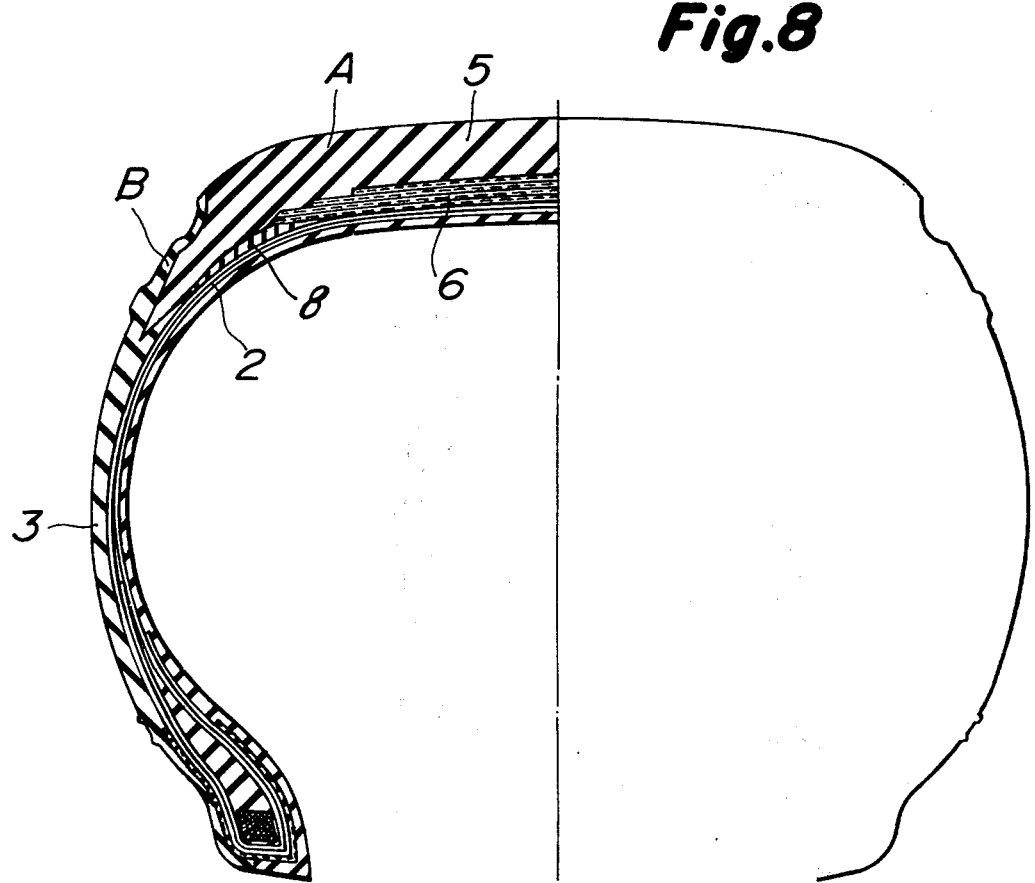
FIG. 8 is a cross-sectional view of a radial tire which is made by the process according to the present invention.

Referring to FIG. 8, the joints thus made by the process of the invention between the side portions B, B' of the tread rubber layer 5 and the side rubber layers 3, 3' are much stronger than the corresponding joints j of tires made by conventional processes because the joints of the invention are formed between similar rubber materials while the joints of the conventional process are between dissimilar rubber materials. The bond between the central portion A and the adjacent side edge portions B, B' of the tread rubber layer 5 is very strong since this bond is formed by extrusion.

Conventionally, suitable rubber-repellent sheets are inserted between sidewalls and a carcass layer when forming a radial tire on a cylindrical former. After shaping the tire into toroidal form, a part of the sidewalls is once separated from the carcass by using the rubber-repellent sheets, so that a breaker layer and a tread rubber can be directly bonded to the carcass, and the sidewalls are finally bonded to the opposing side edges of the tread rubber. On the other hand, with the process of the present invention, the need of the rubber-repellent sheets is completely eliminated. Furthermore, the two-step operation, including the partial separation of the sidewalls and reconnection thereof, is simplified into a single-step process which includes no separation of the sidewalls.

The durability of the radial tire made by the process according to the present invention is materially improved in a very simple manner, as compared with that of radial tires made of conventional processes.

The details of assembling tire elements in the first step and the formation of the green case in the second step are well known to those skilled in the art. Accordingly, such details will not be dealt with here. The vulcanization of the green case in the third step is also carried out in known manner.

The invention will now be described in further detail by referring to an example.

EXAMPLE:

Radial tires of 175 SR 14 type were made by the process according to the present invention, as shown in FIGS. 5 to 7. Reference radial tires of the same 175 SR 14 type were made according to the aforesaid conventional process using rubber repellent sheets as shown in FIGS. 3, 4A, 4B, and 4C. The same materials were used for both the process of the present invention and the conventional process except that the rubber-repellent sheets 4 and the tread rubber layers 5; namely, the same carcass 2, the same breakers 6, and the same side rubber layers 3, 3'. Each carcass 2 included two rubberized cord plies, whose cord consisted of two twisted 840 denier yarns. Each breaker comprised four rubberized cord plies whose cord consisted of three twisted 1650 denier yarns.

The conventional process used rubber-repellent polyethylene sheets 4, but the process of the present invention did not use such polyethylene sheets.

Referring to FIG. 3, in the first step of the conventional process, an intermediate tire assembly was made on a cylindrical former 1 of 348 mm diameter and 337 mm width, by mounting a carcass 2, bead wires, bead fillers, chafers, and two side rubber layers 3, 3' thereon in succession. Each of the side rubber layers 3, 3' was 95 mm wide, and a 75 mm wide polyethylene sheet was inserted between the carcass 2 and each side rubber layer 3, 3' on the tire crown side thereof. More particularly, 70 mm of the entire width of the polyethylene sheet 4 was inserted between the side rubber layer and the carcass 2, but its remaining 5 mm wide edge portion was further extended toward the tire equator beyond the tire crown side edge of the side rubber layer 3, 3'.

Thus, the crown side 5 mm portion of the polyethylene sheet 4 was left uncovered by the side rubber layer.

In the second step of the conventional process, the intermediate tire assembly was removed from the former 1 for mounting it on another former, where it was transformed into a toroidal shape by forcing the two beads toward each other in obliquely downward directions. As a result, the outer radius of the carcass 2 along the tire equator increased to 385 mm. The tire crown side portions of the side rubber layers 3 and 3' were partially separated from the carcass 2 of toroidal shape together with the polyethylene sheets 4 as shown in FIG. 4A. The breaker layer 6 of the aforesaid construction and a tread rubber layer 5 were secured to the crown portion of the carcass 2 in succession as shown in FIG. 4B. Thereafter, the side rubber layers 3 and 3' were returned toward the tire crown portion and bonded to the carcass means 2 and the tread rubber layer 5 for further shaping into a green case as shown in FIG. 4C.

On the other hand, in the first step of the process of the present invention, an intermediate tire assembly was made in the similar manner to that of the first step of the conventional process by using the same former 1 and the same material except that no polyethylene sheets 4 were used. In the second step of the process of the invention, the intermediate tire assembly was transferred from the former 1 to the other former, transformed into a toroidal shape and formed into a green case in the same manner as described in the foregoing with respect to the corresponding second step of the conventional process except that, according to the present invention, the breaker layer 6 and the tread rubber layer 5 were directly mounted on the crown portion of the toroidal carcass 2 in succession without separating the side rubber layers 3 and 3' as shown in FIG. 6A.

It should be noted here that the tread rubber layer 5 used in the process of the present invention is vastly different from that of the conventional process. The tread rubber layer 5 for the conventional process was solely made of an abrasion-resistant rubber material, but the tread rubber layer 5 used in the process according to the present invention was made of two different rubber materials as pointed out in the foregoing in referring to FIG. 7. The tread rubber layer 5 used in this Example for the process of the invention had a top width TW of 140 mm (corresponding to the tread width of a finished radial tire), which was defined by the top surface of the central portion A made of a highly abrasion-resistant rubber material with a Shore A hardness of 66° upon vulcanization. Triangular side edge portions B and B' were secured to the opposite sides of the central portion A, each of which side edge portions had a bottom width of 10 mm and height of 10 mm. The side edge portions B and B' were made of a highly flexible rubber material with a Shore A hardness of 46° upon vulcanization. The tread rubber layer 5 consisting of the central portion A and the side edge portions B, B' was pre-extruded by a duplex tuber of known construction.

Both the green case made by the conventional process and the green case made by the process according to the present invention were vulcanized at 165° C for 22 minutes in a metal mold, respectively.

FIG. 8 shows a sectional view of the radial tire made by the process according to the present invention. As apparent from the figure, the joint between the two different rubber materials according to the present invention is of wedge shape, and hence, its resistance to separation is greatly improved, as compared with the radial tires made by the conventional process.

Figure 10:
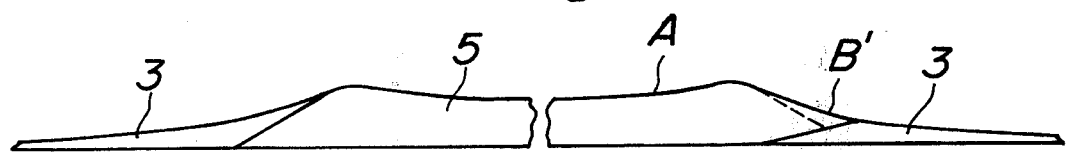

To clarify the difference between the radial tire made by the process according to the present invention and the radial tire made by the conventional process of FIGS. 3 to 4C, sections of the two tires are depicted side by side in FIGS. 9 and 10; namely, FIG. 9 shows a section of the conventionally processed tire on the left-hand side and a section of a tire made by the process of the invention on the right-hand side, and FIG. 10 shows similar sections of the tread portions in an exploded fashion. The aforesaid unique shape of the joint between the two different rubber materials achieved by the present invention is clearly shown in FIGS. 9 and 10.

It was proved by the aforesaid tests that about 30% time saving was obtained in the second step of the process according to the present invention, as compared with the second step of the conventional process, due to the elimination of the three factors; namely, the removal of the polyethylene sheet 4, the partial separation of the side rubber layers 3 and 3', and the return of the side rubber layers.

Durability tests were made on the tires thus made, and it was found that the resistance to the separation of the two different rubber material layers was improved by at least 5% by the process according to the present invention.

What is claimed is:

1. A process for making a pneumatic radial tire comprising forming a carcass means having at least one rubberized carcass ply directly on a cylindrical former, securing a pair of highly flexible side rubber layers in spaced relation to said carcass ply to form the outer part of the sidewalls of the tire, said carcass ply consisting of cords disposed at 70° to 90° to the equatorial direction of the tire, said side rubber layers consisting of a flexible rubber having a Shore A hardness upon vulcanization of 40° to 55°, forming a green case by forming the carcass means and side rubber layers into a toroidal shape, securing a rubberized breaker layer and a preformed tread rubber layer to the tire crown, said breaker layer consisting of cords disposed at 10° to 30° to the equatorial direction of the tire, said tread rubber layer consisting of a central body portion having a width equal to the width of the tire crown and at least a portion of the shoulders and being made of a highly abrasion-resistant hard rubber material with a Shore A hardness upon vulcanization of 55° to 75° and in addition a pair of edge portions made of flexible rubber material like said side rubber layers and integrally prebonded to said central body portion to cover the opposing side edges of said central body portion, the overall width of said tread rubber layer being wider than the spacing of the pair of flexible side rubber layers, forming the tread rubber layer around the toroidal shape of the green case to place the edge portions of the tread rubber layer in overlapping relation with the adjacent edges of the flexible side rubber layers, securing the overlapped edge portions of the tread rubber layer directly to said flexible side rubber layers so that the entire outer surface of the sidewalls of the toroidal-shaped green case is protected by said flexible rubber, and vulcanizing the thus builtup toroidal-shaped green case.

2. A process according to claim 1, wherein said pair of edge portions is made of the same flexible rubber as said side rubber layers.

3. A process according to claim 1, wherein the overall width of said central body portion of said tread rubber layer is wider than the spacing of said pair of flexible side rubber layers so that the central body portion is also in overlapping relation with the adjacent edges of the flexible side rubber layers and so that the overlapped portion is secured to the flexible side rubber layers.

4. A process according to claim 3, wherein the boundary between said side rubber layers and said central body portion and between said pair of edge portions and said central body portion in a cross section of the toroidal-shaped green case defined by a radial plane emanating from the axis of rotation of the tire comprises two line segments which intersect with each other at an acute angle with said central body portion disposed within said angle.

5. A process according to claim 1, wherein said tread rubber layer is pre-extruded by a duplex extruder while using two different rubber materials so as to integrally form said central body portion and said pair edge portions in one operation.

6. A process according to claim 1, wherein said breaker layer has four rubberized cord plies, each cord having three twisted 1650 denier yarns.

7. A process according to claim 1, wherein said carcass means has two rubberized cord plies, each cord having two twisted 840 denier yarns.

* * * * *